United States Patent

[11] 3,580,366

[72] Inventors C. Lucas Plaat;
 Donald F. Linn, Troy, Ohio
[21] Appl. No 826,418
[22] Filed May 21, 1969
[45] Patented May 25, 1971
[73] Assignee The B. F. Goodrich Company
 New York, N.Y.

[54] BRAKE RETRACTOR RESETTING MECHANISM
 1 Claim, 2 Drawing Figs.
[52] U.S. Cl. .................................................. 188/196,
 188/71.8
[51] Int. Cl. ......................................................F16d 65/54,
 F16d 55/18
[50] Field of Search........................................... 188/79.5
 (GT), 71.7, 8, 196 (P)

[56] References Cited
 UNITED STATES PATENTS
 3,091,310 5/1963 Smith et al. .................. 188/196(P)

*Primary Examiner*—Duane A. Reger
*Attorneys*—John D. Haney and Harold S. Meyer

ABSTRACT: A brake retractor assembly in which the automatic adjustment mechanism has a locking plate carried by a sleeve member surrounding the retractor rod and held in tilted locking position during brake retraction and in which the locking plate is automatically moved into unlocked position during brake actuation when the rod is moved beyond the normal brake release clearance distance. A return spring connection between the rod and sleeve member resets the rod automatically to its original position in the sleeve member upon movement of the locking plate to the unlocked position when the brake lining needs replacement.

PATENTED MAY 25 1971  3,580,366

INVENTORS
C. LUCAS PLAAT
DONALD F. LINN
BY John D. Haney
ATTY.

BRAKE RETRACTOR RESETTING MECHANISM

BACKGROUND OF THE INVENTION

This invention relates to mechanism for automatically maintaining a uniform release clearance (and therefore a uniform actuating stroke) for brakes and similar equipment. Mechanisms of this type are commonly used in brake systems to compensate for wear of the brake linings and other brake parts and are popularly called "automatic brake adjusters." Although the present invention is explained here in connection with brakes, the mechanism has utility in other environments where similar wear-compensation is needed such as in clutches.

As the brake linings and other parts wear, the adjusting mechanism of the brake retractor automatically moves the retractor rod to a position which is extended to compensate for the wear. When the retractor rod reaches a certain position, this indicates that the brake lining needs to be replaced. Lining replacement has presented a serious servicing problem because it has necessitated removal of the adjuster from the brake to reset the retractor rod. It has also been necessary to use special tools and equipment because of the special design of the adjuster and retractor to fit in small spaces on an aircraft. Furthermore, it has been necessary to force the retractor rod back into the retractor against the resistance of the locking plate. These difficulties encountered in the replacement of brake linings are especially critical in servicing helicopter installations where space and weight limitations are historically critical. Another problem is that the time and place of brake lining replacement is not predictable since the wear is not the same for different types of braking. This means that replacement of brake linings may have to be done anywhere and at any time. In the operation of aircraft for commercial, private or military applications, time is of the essence and any delay caused by servicing is not only costly but seriously impairs the utility of the aircraft.

SUMMARY OF THE INVENTION

In the retractor assembly of this invention, a retractor rod resetting mechanism is provided which returns the rod to a position where the lining may be replaced without requiring removal of the adjuster from the brake, without having to force back the retractor rod against the latch and without having to use special tools and time-consuming effort. The retractor assembly of this invention includes a heavy-duty locking mechanism in which the locking plate is located where there is space for a reinforced high strength construction. The locking plate is carried by a sleeve member which is movable axially upon actuation and retraction of the brake members. A housing member mounted in the brake torque frame surrounds the sleeve member and a helical retractor spring is interposed between the sleeve and housing. The helical spring is preloaded and bears at one end against a washer seated in the housing and at the other end it bears against a washer mounted on the sleeve member. The sleeve member has a flanged end adjacent the washer in the housing and this flange fits in a groove in one edge of the locking plate. Under the preloaded condition of the retractor spring a lip of the locking plate is held in a leverage-applying condition between the washer and sleeve flange. This leverage causes the locking plate to assume a tilted or canted position in which the plate frictionally engages the retracting rod which is slidably mounted in the sleeve member.

When the brake is actuated, the locking plate remains in frictional engagement with the rod and as the rod is pulled axially out of the housing, the sleeve member travels with the rod a distance which does not exceed a preestablished limit corresponding to the allowable release clearance of the brake members. As a result of the wear of the brake friction faces, however, the operating stroke of the rod increases progressively. Whenever the stroke of the rod exceeds the aforesaid preestablished limit, the locking plate engages a stop member on the housing which straightens the locking plate and automatically disengages the plate from the rod and therefore permits the rod to move freely relative to the locking plate and sleeve until the rod reaches a position in which the brake is engaged.

On the release of the brake actuation system following any such adjusting movement of the rod, reengagement of the locking plate on the rod is effected so that the retraction motion of the sleeve and rod is limited to an amount necessary to maintain a uniform brake release clearance. This result is accomplished without varying the amplitude of deflection of the retractor spring itself. Owing to the fact that the retractor spring has a fixed deflection amplitude, the force required to actuate the brake also remains uniform throughout the life of the brake.

The retractor rod has a cylindrical chamber to accommodate a second spring for resetting the rod. This resetting spring is compressed between a retainer ring at one end of the rod and a plate held in a stationary position relative to the sleeve by a pin extending through the helical spring and mounted on the sleeve. The resetting spring is compressed as the rod is extended axially out of the sleeve during adjusting movement of the rod relative to the sleeve. This compression of the resetting spring continues during every adjustment of the rod for the life of the brake linings.

When it comes time for replacing the lining the locking plate is straightened as by inserting a screwdriver between the housing and locking plate. This unlocks the plate from the rod and permits the resetting spring to return the rod to the starting position. The lining carrier is then turned in a circumferential direction to disengage the rod from the carrier and remove the carrier from the brake. A new lining carrier is inserted in the brake and brought into engagement with the retractor rod. The brake is then ready for operation.

The accompanying drawings show one preferred form of resetting mechanism as applied to a mechanical ratchet-type brake retractor made in accordance with and embodying this invention and which is representative of how this invention may be practiced.

DETAILED DESCRIPTION

Figure 1:
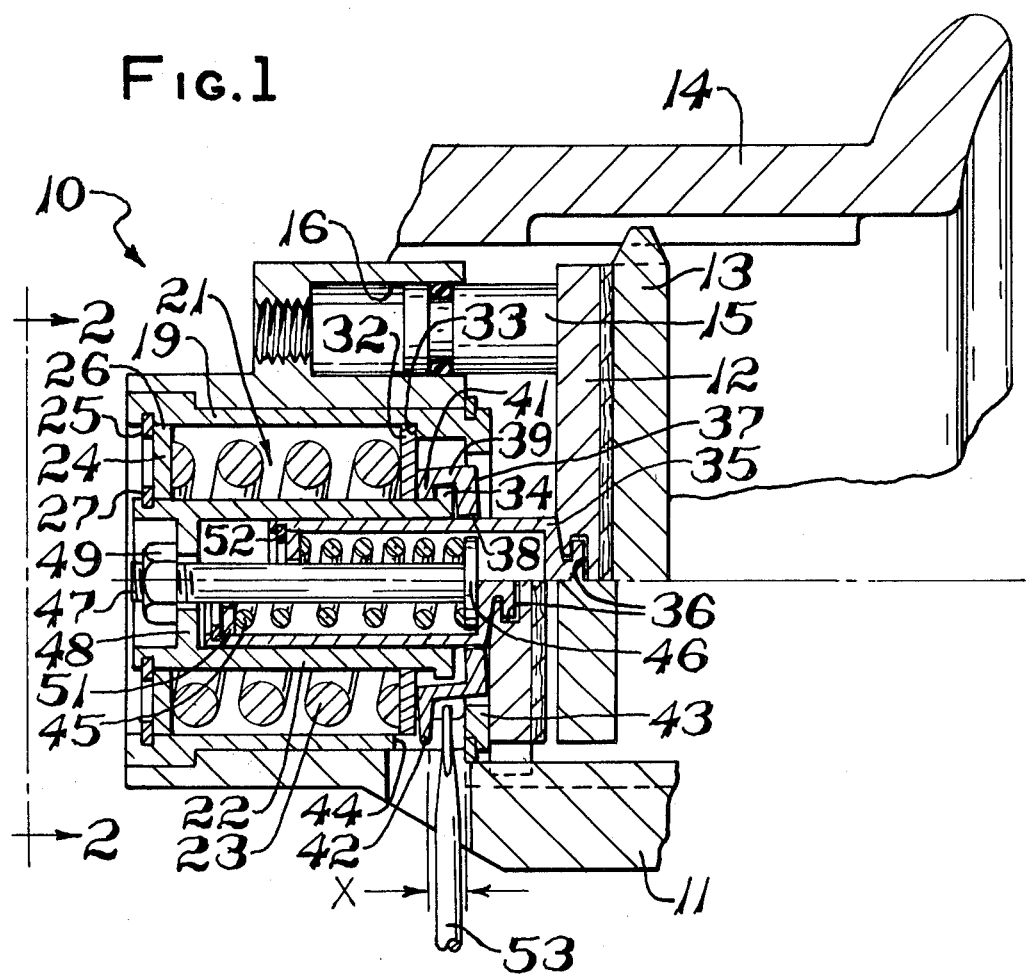
FIG. 1 is a longitudinal cross section of the retractor assembly installed in a typical disc brake, the assembly being in the condition its parts occupy when the brake is retracted or released, the retractor rod being shown with the upper half in the extended position and the lower half in the reset position, the brake parts being shown in generalized or somewhat schematic form with some parts being broken away.
Figure 2:
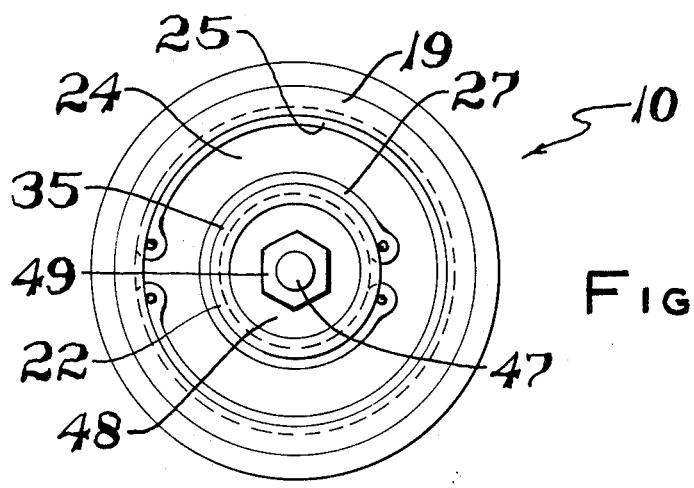
FIG. 2 is a view on the line 2-2 of FIG. 1.

A brake retractor of the general type described hereinafter is the subject of a related patent application having the same assignee as this application. A retractor assembly 10 is mounted rigidly in a torque frame 11 of a brake, the frame in turn being adapted for mounting to a vehicle structure (not shown). Frame 11 carries a lining carrier 12 in parallel axial alignment with a rotatable disc 13. The latter is in splined engagement at its periphery with a rotary member 14 which may be part of the wheel structure with which the brake is associated. On the other side of the rotatable disc 13 in the area which is broken away, another lining carrier and retractor assembly like that shown may be mounted on the torque frame 11.

To actuate the brake and engage the brake members, a hydraulic piston 15 mounted in a cylinder 16 in the brake frame 11 is adapted for displacement in response to hydraulic pressure to urge lining carrier 12 against the brake disc 13 which resists axial movement by engaging other brake members not shown. The brake members as shown in FIG. 1 are in the released condition of the brake with the lining carrier 12 and the rotatable disc 13 out of engagement.

The brake retractor assembly 10 includes a cylindrical housing 19 which may be part of the brake frame 11 or adapted for tight anchorage inside the brake frame as shown in FIG. 1. Extending axially of the housing 19 and contained therein is an adjusting mechanism 21 which is supported for reciprocation within the housing. Adjusting mechanism 21 has a sleeve member 22 disposed in concentric relation to and within the cylindrical housing 19. Interposed between the sleeve member 22 and the housing 19 is a helical retractor spring 23. At the left end of the sleeve 22 (as viewed in FIG. 1) is a spring-retaining member such as washer 24 extending from the sleeve radially outward to the inner surface of housing 19. The washer 24 engages one end of the retractor spring 23 and removal from the housing 19 during operation is prevented by a retaining ring 25 set in a groove in the housing 19 and engageable with the outer periphery 26 of the washer.

At the inner periphery of the washer 24 another retaining ring 27 is set in a groove in the sleeve member 22 on the side of the washer opposite to that in engagement with the retractor spring 23.

At the other end of the housing 19, a spring-retaining washer 32 is seated against a shoulder 33 of the housing and extends from the housing to the sleeve member 22 which is supported by and held in slidable engagement with the washer. The washer 32 serves as an anchorage for the other end of the retractor spring 23 which is compressed in a preloaded condition between the washer 32 and washer 24.

The sleeve member 22 extends (to the right as shown in FIG. 1) axially beyond the washer 32 in the released condition of the brake and has a radially extending flange 34 spaced from the washer at the edge of the sleeve member.

A retractor rod 35 is held in slidable engagement within the sleeve member 22 and extends towards the braking members where it is connected to the lining carrier 12 as by insertion of the enlarged head of the retractor rod 35 in a slot 36 of the lining carrier 12 as shown in FIG. 1 or by other arrangements well known in the art.

A locking plate 37 which is of a generally annular disc shape is disposed at the flanged end of the sleeve member 22 and has a central opening 38 through which the rod 35 projects of slightly greater diameter than the diameter of the rod. The locking plate 37 has an axially extending flange 39 which overlaps the flanged end of the sleeve member 22 at one edge of the locking plate. The flange 39 has a radially inwardly extending edge portion such as lip 41 which is disposed in the space between the washer 32 and the flange 34 of the sleeve member 22. At the diametrically opposite edge of the locking plate 37, the flange 39 has a housing engaging portion such as radially outwardly extending ear 42 which has a radius greater than the radius of a stop member such as inwardly extending flange 43 on the housing 19. This flange 43 and ear 42 are spaced apart a predetermined distance indicated by letter X shown in FIG. 1. An opening 44 in the housing 19 is provided through which the ear 42 may extend.

The rod 35 has a cylindrical chamber to accommodate a resilient helical resetting spring 45 which is mounted in compression within the retractor rod with one end pressed against a plate 46 connected to the sleeve member 22 by a pin 47 which is held in a bushing 48 of the sleeve member as by threaded engagement of nut 49 on the end of the pin which extends through the bushing. The other end of the resetting spring 45 is pressed against a washer 51 held by a retaining ring 52 in a groove at the inner face of the cylindrical chamber of the retractor rod 35.

In the released condition of the brake, the flange 34 of the sleeve member 22 under the bias of retractor spring 23 acting on washer 24 presses the lip 41 of the locking plate 37 against the washer 32 to provide a positive retracted position for the retracting rod 35. The surface of the lip 41 which abuts the washer 32 is tapered outwardly and away from the surface of the washer and this plus the configuration shown in FIG. 1 of the locking plate 37 and flange 39 insures that the locking plate remains tilted and in engagement with the retracting rod when the rod is in a retracted position as shown in FIG. 1. The flange 39 except for ear 42, has a radius less than the radius of the housing flange 43 so that ti may slide past the flange 43 when the rod 35 is reciprocated. The flange 43 is adapted to engage the ear 42 of the locking plate 37 only when the rod 35 is advanced rightward (as shown in FIG. 1) a distance sufficient to bring the ear 42 against the flange 43.

When the brake is operated by communicating hydraulic fluid to piston 15 the latter displaces the lining carrier 12 rightward (as shown in FIG. 1) pulling rod 35 axially through the flange 43 of housing 19. Locking plate 37 moves rightward as the rod advances because of the tilting position of the locking plate which keeps it in tight frictional engagement with the rod 35. Should there be no appreciable wear or other condition materially changing the release clearance between the braking members while these members are engaged, then rod 35 will not be axially displaced an amount sufficient to bring ear 42 of the locking plate 37 against the flange 43. Instead locking plate 37 will remain in a frictionally engaged position with the rod 35. When the brake actuation pressure is released, the retractor spring 23 will expand to return the rod 35 to its original starting position. The mechanism is designed so that the distance designated by dimension X in FIG. 1 between the annular flange 43 and the released position of the ear 42 on the locking plate 37 is equal to the maximum allowable release clearance between the braking members. So long as the release clearance does not exceed an amount indicated by dimension X the locking ring 37 will always remain in tight frictional engagement with rod 35 and the brake members may be engaged and released repeatedly.

Owing to the erosion of the brake members and the brake linings as the brake is used, the release clearance between the lining carrier 12, brake disc 13 and the other brake members tends to increase progressively. The existence of this condition is automatically sensed in this mechanism because rod 35 and lining carrier 12 can be displaced for whatever distance necessary to bring about brake engagement regardless of wear. Accordingly, whenever the lining carrier 12 and rod 35 are moved through a distance greater than that equal to dimension X in order to engage the brake members, the ear 42 of locking plate 37 will be forced into engagement with flange 43. The flange 43 then urges the locking plate 37 into the position in which the radially extending face is straightened to a position where the frictional engagement of the locking plate with rod 35 is reduced. Rod 35 can then be moved through the locking plate 37 and the effective length increased by whatever distance it is required to maintain brake engagement. Referring to FIG. 1, the extended position of rod 35 in the worn condition of the brake is illustrated by the upper half of rod 35 and the original effective length of rod 35 with the brake in the new or unworn condition is illustrated by the lower half of the rod.

On the subsequent release of fluid pressure against the piston 15, the retraction forces on the brake members will act to move rod 35 in the reverse direction and the biasing force of the retractor spring 23 against the sleeve member 22 carrying flange 34 in engagement with lip 41 of the locking plate is effective to tilt the locking plate 37 into a frictionally engaged locking position on rod 35. Accordingly, the retractor spring 23 will then through the agency of the locking plate 37 retract the lining carrier 12 from the other brake members. Since the retraction stroke is limited by the distance locking plate 37 can move before it abuts washer 32, the rod 35 is retracted only a distance equivalent to dimension X and therefore a new starting position is established for rod 35 and the lining carrier 12 in which the release clearance between the lining carrier and the other brake members is again equal to dimension X.

The progressive relocation of the starting position of the rod 35 and the lining carrier 12 in this manner does not change the maximum deflection amplitude of the retractor spring 23. The retractor spring deflection amplitude remains substantially the same on every actuation from the time the brake is new until the lining is entirely worn out.

It can also be seen that as the starting position of the rod 35 is progressively relocated and the effective length of the rod is increased, the resetting spring 45 is compressed between the washer 51 which moves to the right (as shown in FIG. 1) relative to sleeve 22 and the plate 46 which maintains a substantially fixed position relative to sleeve member 22.

When the brake is released there is only the compressive force of spring 45 tending to urge the rod 35 to the left (as shown in FIG. 1) and the frictional grip of locking plate 37 is adequate to maintain rod 35 in any adjusted position. To replace the worn lining carriers, the position of the rod 35 may be reset by merely straightening the locking plate 37 as by an ordinary screwdriver 53 which may be inserted in the opening 44 of the housing and turned to exert pressure against the flange 43 and ear 42. When the locking plate 37 is straightened the gripping of the rod 35 by the edges of the plate is reduced and the spring 45 will push the rod to the left (as shown in FIG. 1) into the sleeve member 22 to the position shown by the bottom half of the rod from the position shown by the top half of the rod in FIG. 1. The lining carrier 12 may therefore be removed by turning it in a circumferential direction so that the enlarged head of the rod 35 may be removed from the slot 36 in the lining carrier. This can be done without removing the retractor assembly or using any special tools. A new lining carrier 12 may then be inserted in the brake and slid into engagement with the rod 35. The brake is then ready to be used.

Depending on the size of the brake, one or a number of these retractor assemblies may be used in axially spaced position in the torque frame.

We, therefore, particularly point out and distinctly claim as our invention:

1. In a brake adjuster mechanism in which movement retractor rod attached to brake operating parts is axially movable inside a housing during actuation and retraction of the brake parts, the retractor rod having its starting position in said housing on each actuation movement fixed by a tiltable plate in local engagement with such rod, the tiltable plate being biased to a position of engagement with such rod by the biasing force of a retractor spring inside such housing, the tiltable plate being adapted for displacement to a position to release such engagement with said rod when the axial displacement of such rod exceeds a predetermined distance to permit additional adjusting movement of said rod, the improvement which comprises a rod resetting spring in said housing adapted for progressive deflection by the successive incremental adjustment positions to which said rod is moved in said housing beyond said predetermined position, and an opening in said housing providing access to said tiltable plate from the exterior of said housing for manually releasing the engagement of said tiltable plate from said rod so that the position of said rod relative to said housing is relocated by the biasing force on said rod exerted by said rod-resetting spring.

PO-1050
(5/69)

UNITED STATES PATENT OFFICE
CERTIFICATE OF CORRECTION

Patent No. 3,580,366    Dated  May 25, 1971

Inventor(s)  C. Lucas Plaat and Donald F. Linn

It is certified that error appears in the above-identified patent and that said Letters Patent are hereby corrected as shown below:

Column 4, line 3, "ti" should read ---it---.

Column 6, line 6, "movement" should read ---a---.

Signed and sealed this 16th day of May 1972.

(SEAL)
Attest:

EDWARD M. FLETCHER, JR.
Attesting Officer

ROBERT GOTTSCHALK
Commissioner of Patents